United States Patent
Mock et al.

(10) Patent No.: US 8,793,756 B2
(45) Date of Patent: Jul. 29, 2014

(54) SECURE PROCESSING OF SECURE INFORMATION IN A NON-SECURE ENVIRONMENT

(75) Inventors: James Robert Mock, Lee's Summit, MO (US); Tracy Wayne Shelby, Kansas City, MO (US); Devin Todd Sherry, Platte City, MO (US); Michael V. Gentry, Toronto (CA); Peter E. Clark, Oakville (CA); Michael C. Hudgins, Kansas City, MO (US); Michael G. Metzger, Overland Park, KS (US)

(73) Assignee: DST Technologies, Inc., Kansas City, MO (US)

( * ) Notice: Subject to any disclaimer, the term of this patent is extended or adjusted under 35 U.S.C. 154(b) by 1589 days.

(21) Appl. No.: 11/643,418

(22) Filed: Dec. 20, 2006

(65) Prior Publication Data

US 2008/0155540 A1    Jun. 26, 2008

(51) Int. Cl.
*G06F 17/00* (2006.01)
*H04L 29/06* (2006.01)

(52) U.S. Cl.
USPC ............................ 726/1; 726/2; 705/301

(58) Field of Classification Search
None
See application file for complete search history.

(56) References Cited

U.S. PATENT DOCUMENTS

| | | | |
|---|---|---|---|
| 5,400,248 A | 3/1995 | Chisholm | |
| 5,455,875 A | 10/1995 | Chevion et al. | |
| 5,797,130 A | 8/1998 | Nelson et al. | |
| 5,862,223 A | 1/1999 | Walker et al. | |
| 5,881,230 A | 3/1999 | Christensen et al. | |
| 5,937,388 A | 8/1999 | Davis et al. | |
| 5,960,404 A | 9/1999 | Chaar et al. | |
| 5,974,392 A | 10/1999 | Endo | |
| 6,181,343 B1 | 1/2001 | Lyons | |
| 6,181,909 B1 | 1/2001 | Burstein et al. | |
| 6,295,439 B1 | 9/2001 | Bejar et al. | |
| 6,338,042 B1 | 1/2002 | Paizis | |
| 6,678,714 B1 | 1/2004 | Olapurath et al. | |
| 6,741,737 B1 | 5/2004 | Lenoir | |
| 6,751,351 B2 | 6/2004 | Knowles et al. | |
| 7,197,459 B1 | 3/2007 | Harinarayan et al. | |
| 7,231,082 B2 | 6/2007 | Lenoir | |
| 7,475,260 B2 * | 1/2009 | Curtis | ........................... 713/193 |
| 7,801,756 B1 | 9/2010 | Harinarayan et al. | |

(Continued)

OTHER PUBLICATIONS

International Search Report, PCT/US 07/86578.

(Continued)

*Primary Examiner* — Nadia Khoshnoodi
(74) *Attorney, Agent, or Firm* — Lempia Summerfield Katz LLC (57) ABSTRACT

A secured process sourcing and work management system for processing secure information in a non-secure environment is disclosed. The system permits a user, referred to herein as a customer or requester, to submit a project, involving a human intelligence task ("HIT"), referred to as a task or task specification, to be performed with respect to secure, confidential or sensitive information, referred to herein as secure information, and have that project completed in a non-secure environment without compromising the security, confidentiality or sensitivity of the secure information. The system may be incorporated into the requestor's workflow, receiving projects therefrom and providing the results thereto. Further, a system is disclosed for implementing a processing workflow for such tasks, the system permitting, based on projects submitted by requestors, the "posting" or distribution of jobs, and subsequent management thereof, to be performed by a workforce operating in or via a non-secure-environment, while protecting the underlying security, confidentiality or sensitivity of the overall project.

27 Claims, 4 Drawing Sheets

(56) References Cited

U.S. PATENT DOCUMENTS

| | | | |
|---|---|---|---|
| 7,805,415 B1* | 9/2010 | Flesher et al. | 707/694 |
| 2002/0069079 A1 | 6/2002 | Vega | |
| 2002/0069235 A1 | 6/2002 | Chen | |
| 2002/0083079 A1 | 6/2002 | Meier et al. | |
| 2002/0112171 A1 | 8/2002 | Ginter et al. | |
| 2004/0199781 A1* | 10/2004 | Erickson et al. | 713/200 |
| 2005/0036681 A1 | 2/2005 | Lenoir | |
| 2005/0065802 A1 | 3/2005 | Rui et al. | |
| 2005/0137926 A1* | 6/2005 | Zhang et al. | 705/9 |
| 2006/0074897 A1* | 4/2006 | Fergusson | 707/4 |
| 2006/0106675 A1 | 5/2006 | Cohen et al. | |
| 2006/0106774 A1 | 5/2006 | Cohen et al. | |
| 2006/0212698 A1* | 9/2006 | Peckover | 713/151 |
| 2007/0055893 A1* | 3/2007 | Dodd | 713/193 |
| 2007/0094390 A1* | 4/2007 | Nussey | 709/225 |
| 2008/0118150 A1* | 5/2008 | Balakrishnan et al. | 382/176 |

OTHER PUBLICATIONS

Captcha, from Wikipedia, the free encyclopedia, obtained at http://en.wikipedia.org/wiki/Captcha, Nov. 14, 2006, 6 pages.

The ESP Game: Labeling the Web, obtained at http://www.espgame.org/, Oct. 26, 2006, 6 pages.

Amazon Mechanical Turk, Artificial Artificial Intelligence, obtained at http://www.mturk.com/, Oct. 26, 2006, 32 pages.

Salon.com "I make $1.45 a week and I love it", obtained at http://www.salon.com/tech/feature/2006/07/24/turks/print.html, Oct. 26, 2006, 6 pages.

Amazon Mechanical Turk from Wikipedia, the free encyclopedia, obtained at http://en.wikipedia.org/wiki/Amazon_Mechanical_Turk, Oct. 26, 2006, 4 pages.

Stardust@Home, an interactive internet-based search for interstellar dust in the Stardust aerogel collector, obtained at http://stardustathome.ssl.berkeley.edu/, Nov. 14, 2006, 11 pages.

Benjamin Hill, PeerMarket, From CommerceNet Wiki, A marketplace mechanism for tapping into the value of human cognition, obtained at http://wiki.commerce.net/wiki/PeerMarket, Nov. 14, 2006, 16 pages.

Benjamin Hill, QuestionMarket, A marketplace mechanism for tapping into the value of human cognition, technical report, Oct. 2005, 19 pages.

Mycroft, US Berkeley School of Information, obtained at http://mycroftnetwork.com/splash/, Nov. 14, 2006, 4 pages.

Aaron Koblin, The Sheep Market: Two Cents Worth, thesis document, UCLA 2006, 42 pages.

Examiner's Report, issued in Canadian Application No. 2,671,368, Jul. 12, 2013, CA.

\* cited by examiner

SECURE PROCESSING OF SECURE INFORMATION IN A NON-SECURE ENVIRONMENT

BACKGROUND

As much as computer and automation technology has been advanced, there are still some tasks which a computer is unable to perform or at least not perform as well or as efficiently as a human being. Such tasks include both subjective and objective based tasks, such as describing/categorizing a picture, transcribing an audio recording involving multiple speakers, etc. Some companies leverage such deficiencies, such as to secure resources or otherwise inhibit computer-automated attacks or abuse. For example, the Captcha challenge-response test, promulgated by Carnegie Mellon University, utilizes a test which presents words or alphanumeric strings hidden in distorted or obscured images and requires the user to enter what they see, as a security test to confound automated systems and ensure that a human being is actually interacting with the protected system. However, for other companies, these deficiencies represent both an impediment to efficient workflows and a source of increasing costs.

These types of tasks are often referred to as human intelligence tasks ("HIT"'s) because they depend on the human intellect to be accomplished or accomplished effectively and/or efficiently. Companies whose business workflow depends on HIT's often need to employ a substantial and/or highly skilled work force in order to complete these types of tasks. For example, an Internet search engine company needing to describe and catalog a library of pictures so that they may be searchable may require a large work force in order to perform the task on a large amount of data in a reasonable amount of time.

To assist companies which depend on HIT's, services have been developed to outsource the performance of these tasks to foreign countries offering large low-wage labor pools or, alternatively, to an Internet based community of voluntary, part-time or ad-hoc workers/independent contractors. An exemplary service of this type is offered by Amazon.com, known as the Mechanical Turk or MTurk, which allows a company or other entity to present an HIT to an Internet community, offering compensation in exchange for performance of the task.

While such systems have evolved to fill the need for a human workforce to perform simple HIT's, many businesses are unable to take advantage of such services due to the secure or confidential nature of the HIT that they need to have performed. For example, distributing a task involving the transcription of social security numbers to an Internet based ad-hoc workforce would present issues of privacy protection and liability. Therefore, these businesses must rely on an internal trusted work force, operating under suitable controls/security measures, to perform the necessary tasks.

Accordingly, there is a need for a system that would permit the outsourcing of HIT's involving secure and/or confidential information to non-secure environments without compromising the information or creating undue liability.

DETAILED DESCRIPTION OF THE DRAWINGS AND PRESENTLY PREFERRED EMBODIMENTS

By way of introduction, an accessible and secured process sourcing and work management system for processing secure information in a non-secure environment is disclosed. The system may be deployed organizationally, locally, regionally and/or globally in either a publicly accessible and/or restricted access implementation. The system permits a user, referred to herein as a customer or requestor, to submit a project, involving a human intelligence task ("HIT"), referred to as a task or task specification, to be performed with respect to secure, confidential or sensitive information, referred to herein as secure information, and have that project completed in a non-secure environment without compromising the security, confidentiality or sensitivity of the secure information. As will be described, the system may be incorporated into the requestor's workflow, receiving projects therefrom and providing the results thereto. Further, a system is disclosed for implementing a processing workflow for such tasks, the system permitting, based on projects submitted by requesters, the "posting" or distribution of jobs, and subsequent management thereof, to be performed by a workforce operating in or via a non-secure-environment, while protecting the underlying security, confidentiality or sensitivity of the overall project. The workforce may include an at-will population of participants selected from the general public or from a subset thereof and may be limited to a selective workforce.

As used herein, a workflow is defined as the activities, e.g. tasks or procedural steps, entities involved, i.e. actors or participants, such as people, organizations, machines, etc., inputs and outputs, states, requisite tools, and the relationships therebetween, for each step in a process. The various activities, entities, inputs, outputs, tools and relationships which make up the workflow are referred to as workflow elements. While computers and computer programs may be included as workflow elements, the disclosed embodiments are directed to workflows which further include workflow elements involving human decision making, human judgment, human-to-human interaction, or other subjective, arbitrary or illogical bases.

Figure 1:
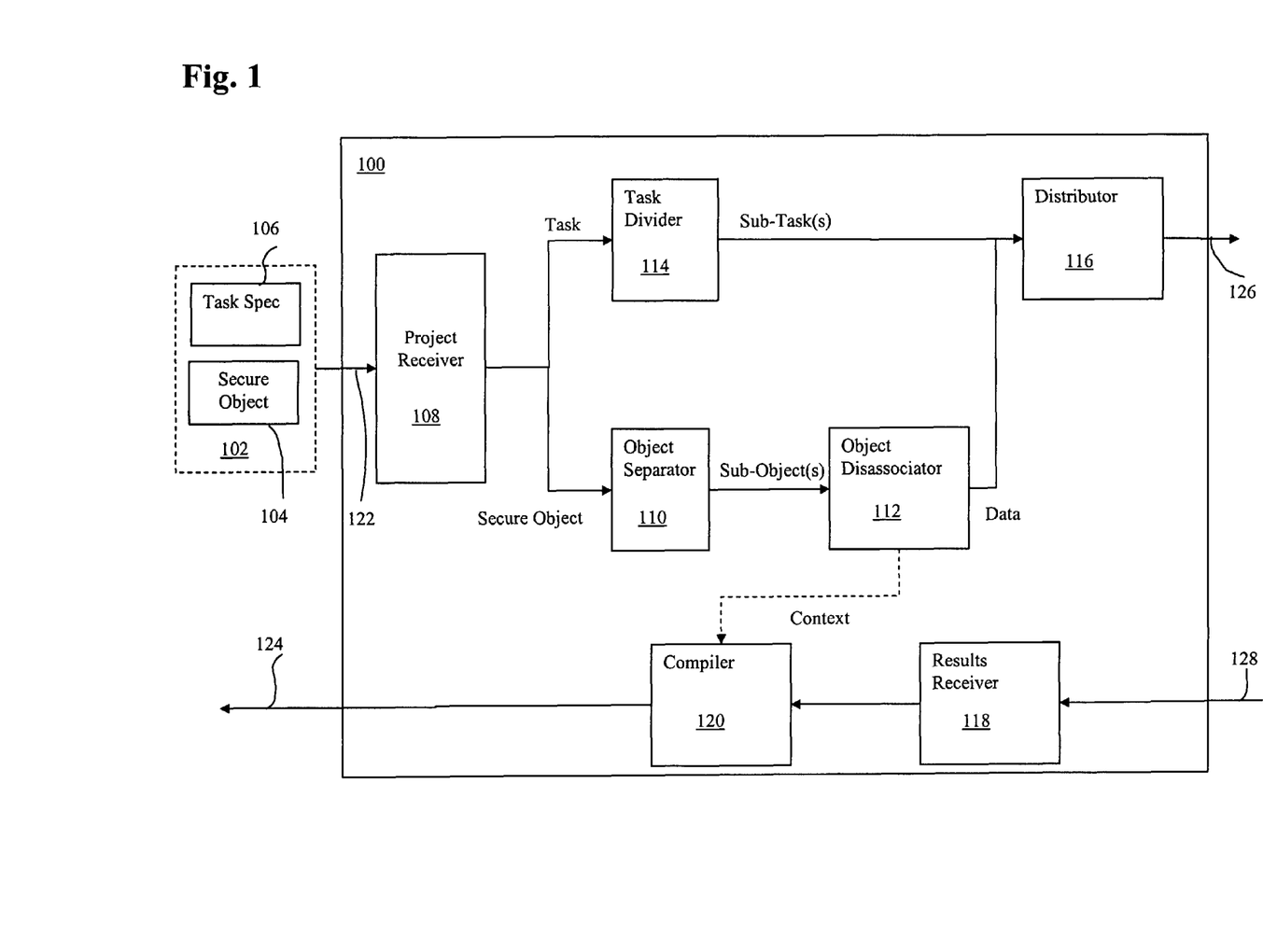
FIG. 1 depicts of a system for processing secure information in a non-secure environment according to one embodiment.

FIG. 1 depicts a block diagram of a system 100 for processing secure information in a non-secure environment according to one embodiment. As used herein, a non-secure environment refers to a logical and/or physical electronic and/or business-process environment in which a business, government or other entity, such as a project requestor described below, may have little or no substantial control over the information, or access thereto, that is being processed and/or stored therein due to a lack of suitable physical, electronic and/or legal safeguards, such as tamper detection mechanisms, security protocols, confidentiality agreements, government provided legal protections, etc. Non-secure environments may include any environment located outside of a particular entity's secure environment, and may include another secure environment coupled therewith via a non-secure medium. It will be appreciated that whether a particular environment is secure or non-secure is relative to a particular entity and that an environment which is considered secure by one entity may be considered non-secure by another entity. Exemplary non-secure environments include personal computers coupled with the Internet via publicly accessible communications links or otherwise not under the control of an entity which operates a secure environment connected therewith. For example, a company may operate a secure Intranet to which only company employees have access from secure communications links. This Intranet may be further securely coupled with the Internet to provide access thereto while protecting the Intranet from non-employee access. In this example, the Internet and any entity connected thereto which is not under suitable control of the company, such as via suitable communications security protocols, may be considered a non-secure environment.

The system 100 includes a project receiver 108 for receiving a project 102 from a project requestor (not shown), such as an internal or external customer of the operator of the system 100. In one embodiment, the system 100 is provided by a service provider (not shown) to requestors who are customers of the service provider. The service provider may charge the customers for use of the system 100 or seek other compensation for the use thereof. Alternatively or in addition thereto, the system 100 may be provided/operated by a business for the benefit of internal requestors. In one embodiment, the project receiver 108 is a web site or web service executing on a web server and accessible by users via a network 122 using a web browser program, such as Internet Explorer published by Microsoft Corporation, located in Redmond, Wash. Other browser programs may also be used, such as Firefox, published by the Mozilla Organization. The network 122, as well as networks 124, 126 and 128, may be a secure network, such as an Intranet or Extranet, or may be an non-secure network, such as a publicly accessible network, e.g. the Internet. In the case of a non-secure network 122, security protocols, such as Secure Sockets Layer, encryption protocols or combinations thereof, may be used. Further, the network 122 may be implemented via a medium that is wired, wireless or a combination thereof.

Figure 2:
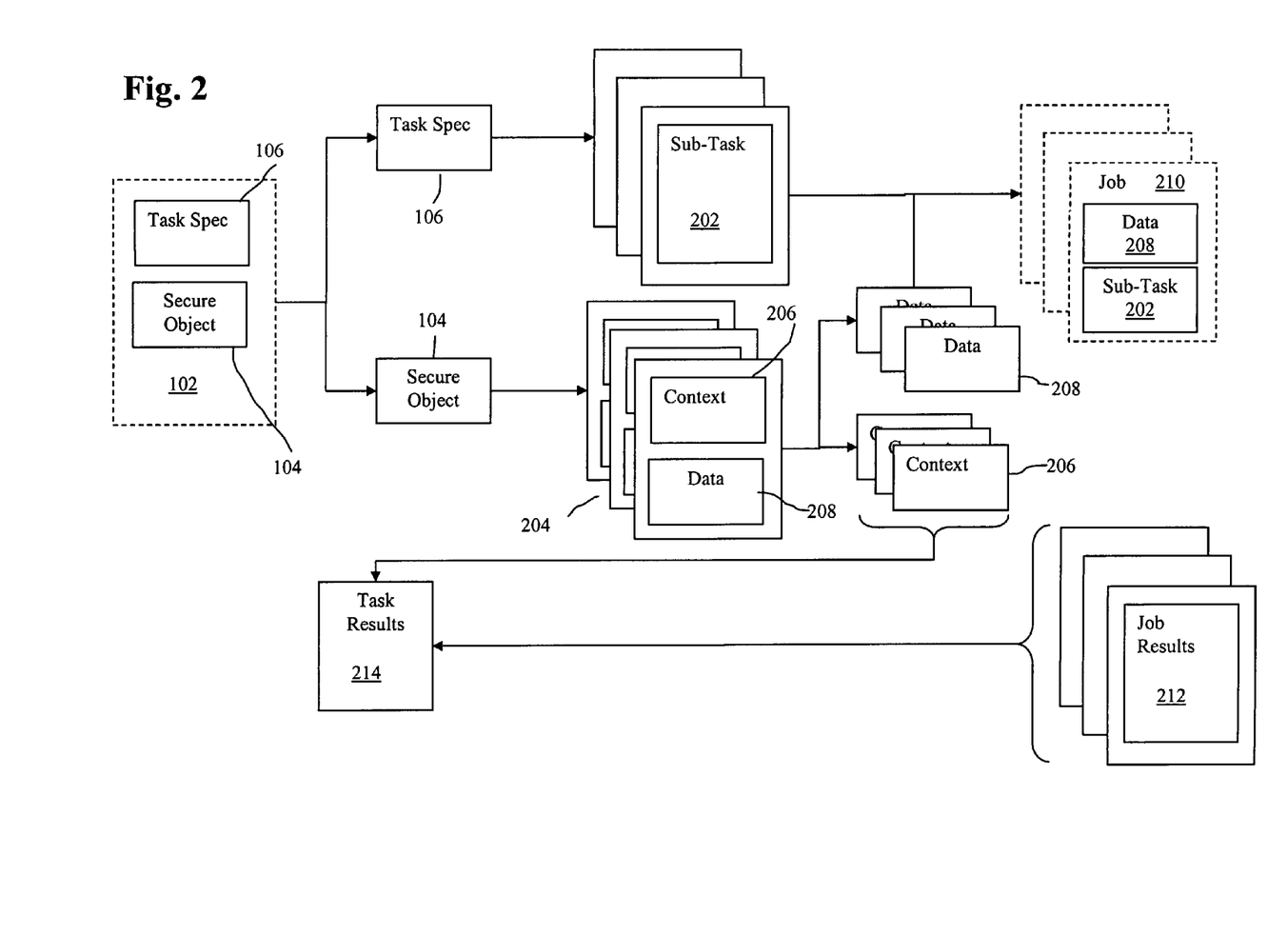
FIG. 2 depicts an exemplary project, and components thereof, as utilized by the system of FIG. 1.

The project receiver 108 allows a requestor to submit a project 102 to the system 100 for processing and subsequently receive the results 214 thereof. As shown in FIG. 2, in one embodiment a project 102 includes a specification of the task 106 to be performed and at least one object, such as a secure object 104, or specification thereof, on which the specified task 106 is to be performed. It will be appreciated, that a project 102 is a logical construct which includes a task specification 106 and a secure object 104. However, the task specification 106 may be provided to the system 100, such as via the project receiver 108, independently, both temporally and spatially, of, or in conjunction with, the secure object 104 and that a given task specification 106 may pertain to more than one secure object 104, each of which may be provided to the project receiver 108 along with or independent from the task specification 106. Alternatively, the task specification 106 may be implied based on or inferred from other factors, such as the secure object 104 or other parameters related to the requestor or the system 100. For example, in one embodiment, the system 100 may be dedicated to converting handwritten text to computer comprehensible data and therefore the task 106 may be inferred from the dedicated nature of the system 100 to perform such a conversion on any handwritten text provided thereby obviating the need to explicitly specify the task 106. As will be described, a secure object 104 includes at least a portion thereof which is considered secure, confidential and/or sensitive at least by the requestor. Task specifications 106, also referred to as tasks 106, are the specification, explicit and/or implicit, of actions, e.g. instructions or directions, to be taken with respect to the secure object 104. Tasks 106 include those tasks which a human being is capable of performing and which a computer may be incapable of performing at all or in an effective and/or efficient manner, such as data entry, conversion, translation, verification, transcription, analysis, identification, description, categorization, classification, selection, indexing, correction, adjustment, isolation, relation, quality assessment or assurance, or combinations thereof. Exemplary tasks 106 include: objective tasks, such as transcription, conversion, translation and/or data entry of audible, handwritten or otherwise machine unintelligible information and/or verification of a machine based transcription, conversion and/or translation; or subjective tasks including reviewing, opining on and/or processing of audio, visual, tactile, olfactory, gustatory or other information, such as audio or photo analysis, identification, categorization, classification and/or selection, e.g. selection of the 'best' photograph from among a selection of photographs, identify a dominant color or sound, distinguish and/or isolate images or sounds from other images or sounds or from noise, provide a context, description or descriptive terms for an image or sound, recognize and/or identify portions and/or attributes of an image or sound, correct, alter and/or adjust an image or sound, such as the quality or intelligibility thereof, relate an image or sound to a concept and/or to other images or sounds based on content, attributes or a combination thereof. Further, tasks 106 may include quality control tasks such as verifying the quality of the performance of one of the tasks 106 described above. In one embodiment, the tasks 106 include the task of transcribing handwritten information provided on a form (the secure object 104), such as a name, address or social security number, into computer intelligible data. In an alternate embodiment, the task 106 may include verifying a machine translation or transcription, such as verification of the results of an optical character recognition process.

The secure object 104 includes the data or information, or a specification thereof, on which the task 106 is to be performed and may include visual, audio or other information or data, in analog or digital form, or combinations thereof. As will be described below, at least some portion of the secure object 104 is considered, e.g. comprehended, at least by the requester, as secure, confidential or otherwise sensitive, while other portions may not be considered as such. Exemplary secure objects 104 may include one or more data files, facsimile pages, pictures, images, audio recordings, or combinations thereof. In one embodiment, the secure object 104 includes one or more digitally scanned images of handwritten documents and/or hand-filled-in forms, such as a document having pre-printed or otherwise defined regions for the entry of information. In an alternate embodiment, the secure object 104 may include digital data representative of the conversion of a handwritten document or hand-filled-in form into a machine intelligible format, such as into a data file generated by optical character recognition for use by a computer program or storage in a database. It will be appreciated that the system 100 may also be utilized with projects 102 involving objects that contain no secure, confidential or sensitive information. Such non-secure objects (not shown) may be processed the same as secure objects 104 as will be described or they may be processed in a different manner.

A secure object 104 is further capable of being separated, automatically, manually or a combination thereof, into one or more secure and/or non-secure sub-objects 204, each sub-object including data 208 and a context 206 associated therewith. With regards to secure sub-objects 204, the context 206 at least characterizes the data 208 as being secure, confidential or sensitive, where this characterization is not otherwise discernable from the data 208 alone. The context 206 may include an attribute associated with the data 208, such as a characteristic of the data 208 or a label, tag or data type associated with the data 208, identification of the source or destination of the data 208, a relationship with other data 208 of another sub-object 204, or a combination thereof. For example, the context 206 may include a label identifying the data 208 as representative of a name, a social security number, a telephone number, credit card number, personal identification number, address or portion thereof, birth date, identity of a relative, etc. Other examples of contexts 206 include the number of numeric digits, such as six digits, which may indicate that the data 208 is a calendar date, ten digits, which may indicate that the data 208 represents a telephone number with area code, nine digits which may indicate that the data 208 represents a social security number, or sixteen digits which may indicate that the data 208 represents a credit card number. Where the data includes the name of a month or day of the week, the context 206 thereof may imply a calendar date. In the disclosed embodiments, as will be described below, contexts 206 that identify data as secure, confidential and/or sensitive are separable from the associated data 208 such that such contexts 206 may not be discerned from the data 208 alone, e.g. a user viewing the data 208 would not comprehend the context 206 of that data 208, e.g. that the data 208 represented a social security number for example. It will be appreciated that the described hierarchical arrangement/structure of the secure object 104 is for descriptive convenience and may be implementation dependent. Accordingly, any suitable arrangement/structure of the secure object 104 may be utilized with the disclosed system 100.

The system 100 is particularly suited to those tasks 106 that are capable of being performed on data 208 without knowledge and/or independent of the context 206 thereof, or at least those tasks 106 that are capable of being performed on data 208 without knowledge and/or independent of a context 206 that characterizes that data 208 as secure, confidential and/or sensitive. For example, the completion of a task 106 of transcribing hand-written social security numbers into computer intelligible data does not require knowledge that the information in fact represents social security numbers but instead merely requires the recognition of the numeric digits and the arrangement thereof. Similarly, completion of a task 106 transcribing an audio recording of a meeting does not require knowledge of the identities of the speakers or that the transcriber even possess the entire recording. In one embodiment, the specified task 106 may be further divided into one or more sub-tasks 202 corresponding to the one or more sub-objects 204, each sub-task 202 being capable of being performed on the context 206 independent data 208 such that the performance of all the sub-tasks 202 is substantially equivalent to the performance of the whole task 106 on the whole secure object 104. For example, with respect to a task 106 to transcribe an audio recording (the secure object 104), the task 106 may be sub-divided into sub-tasks 202, each of which is to transcribe a portion of the audio recording, i.e. the secure sub-objects 204 consist of portions of the audio recording. The audio recording may be divided into portions based on time, e.g. 5 minute segments, or by speakers, e.g. each speaker is separated out. Once each portion of the audio recording has been transcribed, the results may be compiled into a transcription of the entire audio recording.

The packaging of a particular sub-task 202, either explicitly or implicitly as will be described, along with one or more of the associated data 208 with respect to which the sub-task 202 is to be performed, and without the context 206 associated therewith, is referred to herein as a job 210. In one embodiment, data 208 derived from more than one project 102 and/or secure object 104 may be packaged in a single job 210, such as to improve efficiency where one or more requestors submit more than one similar project 102 or secure object 104 with similar tasks 106 to be performed. For example, where multiple hand-filled in forms are to be transcribed, a particular field, suitable de-contextualized, such as the zip code field, from all or a subset of the forms may be packaged together as a single job 210 for performance of the transcription task by a single participant. While the disclosed embodiments will be discussed with reference to distributing jobs 210 without the context 206 associated with the data 208 of the job 210, it will be appreciated that where the context 206 does not characterize the data 208 as secure, confidential or otherwise sensitive, the context 206 may be included in the job 210. It will be appreciated that a job 210 is a logical construct which includes a sub-task specification 202 and associated data 208. However, the sub-task 202 may be provided by the system 100, such as via the distributor 116, independently, both temporally and spatially, of, or in conjunction with, the associated data 208 and that a given sub-task 202 may pertain to more than one associated data 208, each of which may be provided to a participant along with or independent from the sub-task 202. Alternatively, the sub-task 202 may be implied based on or inferred from other factors, such as the associated data 208 or other parameters related to the requestor, the participant, such as their past experience or capabilities, or the system 100. For example, in one embodiment, the system 100 may be dedicated to converting handwritten text to computer comprehensible data and therefore the sub-task 202 may be inferred from the dedicated nature of the system 100 to perform such a conversion on any handwritten text provided thereby obviating the need to explicitly specify the sub-task 202. Jobs 210 may further include additional information such as instructions and/or an offer of compensation to whoever elects to perform the sub-task 202. Alternatively, or in addition thereto, the job 210 may further include a client or server-side executable computer program, such as an applet or other locally offline or on-line executable program, which facilitates performance of the sub-task 202 on the data 208, such a viewer/data entry program and/or interface. In yet another alternative embodiment, a job 210 may merely include one or more references, such as a secure or unsecure hypertext link or other network reference, to the sub-task 202 and/or data 208 where the sub-task 202 and/or data 208 are available via the referenced location, such as via a website. The referenced location may permit the downloading of the sub-task 202 and/or data 208 so that the sub-task 202 may be performed locally by the participant or the referenced location may provide an execution/application environment in which the participant performs the sub-task 202 on the data 208, such as an on-line application environment, or a combination thereof. As will be described, the system 100 distributes the job(s) 210 to, or via, a non-secure environment to a workforce (not shown) where the particular sub-tasks 202 will be performed with respect to the associated data 208. The results thereof are referred to as the job results 212, job fragments or fragments, and may include non-performance of the sub-task 202 or other information, such as where the participant is unable to perform the sub-task 202, e.g. due to a system error such as incomplete or unintelligible data 208, or refuses, forgets or otherwise fails to perform the sub-task 202, e.g. within a prescribed time period. The job results 212 of each distributed job 210 are returned to the system 100 subsequent to completion (or the lack thereof). Once all of the job results 212 are received for all of the jobs 210 for a given secure object 104, they are then compiled or otherwise assembled, re-associating the context

206 if necessary, to generate the overall task results 214 representative of the completion of the task 106 on the secure object 104. Job results 212 representative of an incomplete or incorrect completion of the sub-task 202 may be re-distributed for successful completion to the same or a different participant.

As used herein, the workforce refers to the participating human actors, a.k.a. participants, who will complete the sub-tasks 202 of the jobs 210. The workforce participants may include employees of the requester, employees of the operator of the system 100, independent contractors, ad hoc employees, volunteers or combinations thereof. Workforce participants may participate by accessing the system 100 via a network 126, 128, such as via the Internet, to obtain or "pull" jobs 210, jobs 210 may be "pushed" by the system to workforce participants, or a combination thereof, and to return the job results 212. The various workforce participants may have varying skills sets or other attributes, such as availability, cost, quality of work product, etc. which differentiate them. Such attributes may be evaluated and/or tracked by the system 100 and utilized to selectively match jobs 210 with workforce participants. As was described, workforce participants may be located in, or communicate with the system 100 via, a non-secure environment.

Referring back to FIG. 1, the project receiver 108 is further coupled with an object separator 110 and a task divider 114. Herein, the phrase "coupled with" is defined to mean directly connected to or indirectly connected through one or more intermediate components. Such intermediate components may include both hardware and software based components. The project receiver 108 separates the received project 102 into the task 106 or the specification thereof, and the secure object 104 with respect to which the task 106 is to be performed. Where the task 106 is separately provided, implied or inferred, such as in advance with another secure object 104, the project receiver 108 obtains or otherwise identifies the task 106 associated with the secure object 104. If either the task 106 or the secure object 104 is received alone, the project receiver 108 may store or otherwise buffer the task 106 or secure object 104 until the other is received. The task 106 is provided/communicated to the task divider 114 and the secure object 104 is provided/communicated to the object separator 110. The object separator is further coupled with an object disassociator 112. The object disassociator 112 and task divider 114 are both coupled with a distributor 116. The system 100 further includes a results receiver 118 and a compiler 120 coupled with the results receiver 118.

The object separator 110 receives the secure object 104 and divides it into one or more secure sub-objects 204, each including data 208 and a context 206 associated therewith, as was described above. In one embodiment wherein the secure object 104 includes a digital representation, such as a scan, of a form document having predefined fields for the entry of handwritten information, the object separator 110 may utilize a template or overlay which identifies the various regions of the document associated with the form fields allowing each region, i.e. each field, to be identified and separated out. The template or overlay may be defined using Extensible Markup Language ("XML") or other suitable methodology. Each of the secure sub-objects 204 is then provided to the object disassociator 112 which disassociates the data 208 from the context 206, such as by separating the label or tag from the data 208 which it describes, or by modifying the data 208, e.g. decomposing it into smaller portions, so as to obfuscate any attributes thereof, or combinations thereof. The disassociated context 206 may be stored (not shown) for later use, such as when the job results 212 are returned for the particular sub-task 202 performed on the associated data 208. The disassociated data 208 is then provided to the distributor 116 as will be described. In one embodiment, the object separator 110 and object disassociator 112 may be combined and perform the separation of the secure object 104 into one or more secure sub-objects 204 and the decontextualization of those secure-sub objects 204 in the same operation. The disassociation of the data 208 from its associated context 206 may be an automated process wherein the object disassociator 112 identifies the data 208 and the context 206, such as by utilizing a template or overlay, pattern recognition, programmed identification methodology, such as an XML specification, or other automated mechanism. Alternatively, the disassociation of the data 208 from its associated context 206 may be a manual process wherein the object disassociator 112 receives a specification separately identifying the data 208 and context 206, from the requestor and/or from the operator of the system 100. In yet another alternative embodiment, the disassociation of the data 208 from its associated context 206 may be a combination of a manual and automated process wherein the object disassociator 112 receives a specification identifying the data 208 and context 206, from the requestor and/or from the operator of the system 100, such that the context 206 may be automatically disassociated from the data 208 by the object disassociator 112.

The task divider 114 receives the specified, implied or inferred task 106 and divides the task 106 into sub-tasks 202, each of which may be performed with respect to the disassociated data 208 of each secure sub-object 204. The task divider 114 generates the sub-tasks 202 such that the compiled results of the performance of all of the sub-tasks 202 substantially approximates the result that would be achieved if the task 106 were to be performed on the secure object 104. In one embodiment, each sub-task 202 is substantially the same as the task 106, wherein the data with respect to which each sub-task 202 is to be performed varies. For example, wherein the task 106 may be to transcribe a list of two hundred handwritten social security numbers into machine intelligible data, each sub-task 202 may be to similarly transcribe a portion thereof, e.g. one sub-task 202 may be to transcribe the first half of each social security number while another sub-task 202 is transcribe the remaining portion. Alternatively, different sub-tasks 202 may need to be performed on different data 208 to achieve substantially the same results as the performance of the task 106 on the secure object 104. The sub-tasks 202 are provided/communicated to the distributor 116. In one embodiment, the task divider 114 automatically divides the task 106 in to sub-tasks 202, such as based on the secure sub-objects 204 and/or the disassociated data 208. Alternatively, the division of tasks 106 into sub-tasks 202 may be a manual, or a combination of a manual and automated, process whereby the requestor and/or the system 100 operator provide a specification to the task divider 114, such as within the task 106 itself, specifying the division of the task 106 into sub-tasks 202. It will be appreciated that in systems 100 where the task 106 and sub-tasks 202 may be implied or inferred throughout, such as in system 100 which is dedicated to single task 106 or sub-task 202, the functionality of the task divider may also be implied or inferred rather than explicitly provided for.

The distributor 116 receives the disassociated data 208 and the sub-tasks 202 associated therewith if specified, generates one or more jobs 210 based thereon and arranges, automatically, manually or a combination thereof, to have the jobs 210 performed/completed, such as by one or more available participants of the workforce, defined above. Each job 210 may include a sub-task 202, where explicitly specified, plus the disassociated data 208 with respect to which the sub-task 202 is to be performed. The jobs 210 are then distributed to a workforce to be completed. In one embodiment, the distributor 116 includes a network 126, e.g. Internet, accessible web site which users may access using a personal computer and web browser program. The web site may permit the user to take and/or accept (a.k.a. "pull") one or more jobs 210. Alternatively, or in addition thereto, the distributor 116 may be in communication with a standing workforce, e.g. users or employees that have volunteered or have been hired or otherwise engaged to be available to accept and complete jobs 210. In this embodiment, the distributor 116 may send jobs 210 to selected users to be completed (a.k.a. "push"). In still another embodiment, the distributor 116 maybe in communication with a commercial job 210 distribution system, such as the Mturk system made available by Amazon.com, where jobs 210 are communicated to be ultimately disseminated to users for completion. Jobs 210 may be distributed and/or queued for distribution on a priority or other basis, such as first-in-first-out. Further, the distributor may limit the presentation of available jobs 210 and/or couple incentives with higher priority jobs 210 to ensure the priority distribution thereof. As was described above, each job 210 contains data 208 that has been disassociated with its context 206. As such, whoever elects to complete the job 210 should not be able to discern any secure, confidential or sensitive nature of the data 208, thereby allowing the job 210 to be completed in a non-secure environment while protecting the data 208. Accordingly, the workforce to which the distributor 116 distributes the jobs 210 need not be located in a secure environment. To further ensure the protections of the data 208, the distributor 116 may further implement additional security protocols, such as a protocol to prevent a particular user from performing multiple jobs 210 generated from the same project 102 on the chance that the context 206 of the data 208 of one job 201 may be discernable from the collective jobs 210 the user is performing. Further aspects and alternatives to the distributor 116 will be discussed below.

Once a job 210 is completed, the results 212 therefrom are received by the results receiver 118. In one embodiment, the results receiver 118 may include a network 128, e.g. Internet, accessible web site which a user accesses to submit the results of a job 210. The results receiver 118 may be any suitable interface for receiving the job results 212 of a given job 210 and may be a part of the distributor 116. In one embodiment, the distributor 116 and results receiver 118 are combined into a web site to which a user accesses to obtain a job 210, perform the sub-task 202 therein on and/or off-line with the web site and provide the results 212 thereof. The contents of the job results 212 are dependent upon the implementation of the system 100 but will generally include the resultant work product of the performance of the sub-task 202 on the disassociated data 208. For example, the job results 212 may a digital data file containing machine intelligible data. Where the participant is unable or incapable of performing the sub-task 202, the lack of performance and any underlying reasons therefore may be provided as job results 212. The received job results 212 are provided/communicated to the compiler 120 which assembles the job results 212 for all of jobs 210 generated from a given project 102, automatically, manually or a combinations thereof, into the overall task results 214. The results receiver 118 and/or compiler 120 may further evaluate the job results 212 prior to assembly, such as to detect any errors or otherwise perform quality control checking. For example, in one embodiment, each job 210 may be distributed to more than one participant, where the job results 212 of each performance are compared to ensure accuracy, etc. Alternatively, test jobs 210, where the correct job results 212 are already known to the system 100 may be utilized to ensure quality. Where the evaluation reveals unacceptable job results 212 or the indication of non-performance of the sub-task 202, the results receiver 118 and/or compiler 120 may be in communication with the distributor 116, or otherwise arrange to redistribute the particular job 210 to the same or a different participant to be performed again. The task results 214 are then provided to the original requestor who requested completion of the particular project 102. In one embodiment, the compiler 120 may include a network 124, e.g. Internet, accessible web site which a project requester accesses to receive their task results 214. The compiler 120 may be a part of the project receiver 108 creating unified interface for receiving project 102 submissions and providing the results 214 therefrom.

It will be appreciated that the system 100 may be implemented in hardware, software or a combination thereof, and that one or more of the components thereof may be combined or, alternatively, sub-divided into other functional units, to implement the described functionality. Further, the system 100 may include other components which are not shown. In one embodiment, the described functionality is implemented in computer program logic stored in a memory device, such as a computer memory or computer storage device, and executable by one or more processors to implement the described functionality. For example, the described functionality may be implemented on a web server as one or more network accessible web pages coupled with suitable back-end logic.

Figure 3:
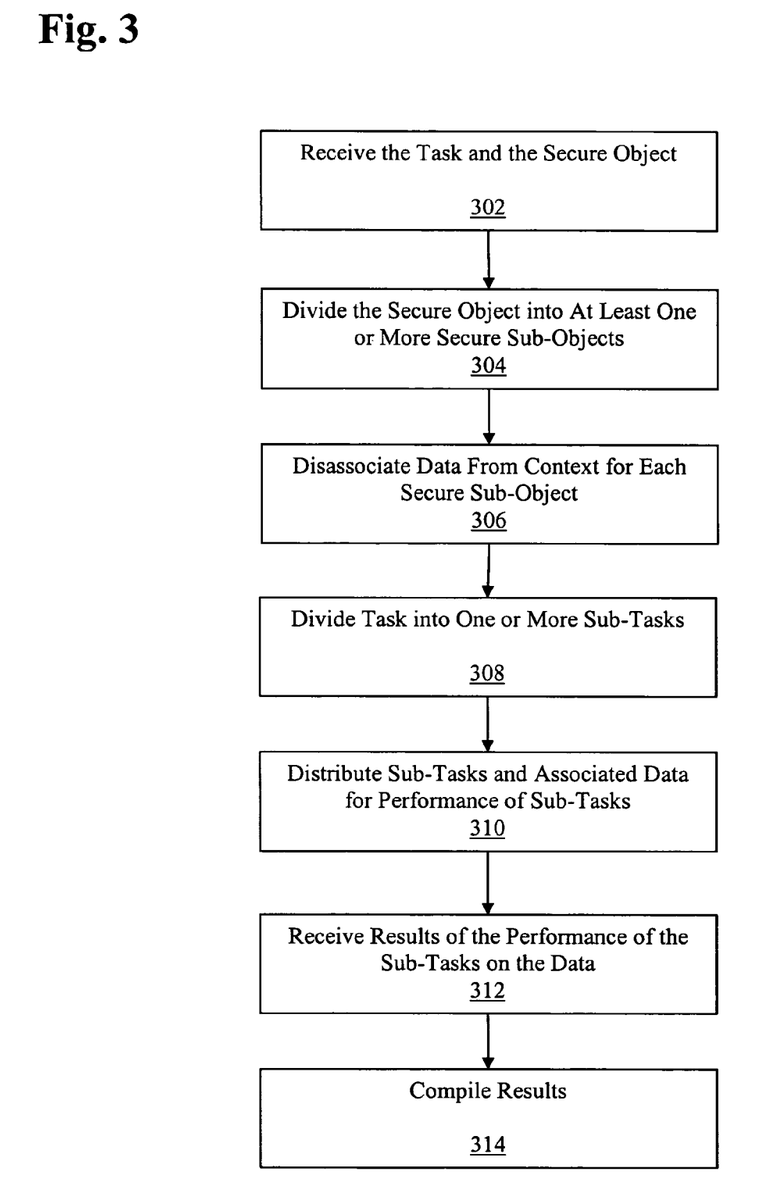
FIG. 3 depicts a flow chart showing exemplary operation of the system of FIG. 1.

FIG. 3 depicts a flow chart showing exemplary operation of the system 100 of FIG. 1 for completing a task 106 in a non-secure environment with respect to a secure object 104. In one embodiment, the secure object 104 may comprise computer incomprehensible information, the task 106 comprising converting the computer incomprehensible information into computer comprehensible information. For example, the secure object 104 may comprise a representation of a handwriting, a picture, an image, a facsimile, a document, an audio recording, a video recording, or combinations thereof. Further, exemplary tasks 106 may include data entry, conversion, translation, verification, transcription, analysis, identification, description, indexing, categorization, classification, selection, separation, isolation, recognition, sorting, correction, relation, opining, assessment, judgment or combinations thereof.

The operation of the system 100 includes: receiving, in a secure environment, a specification of the task 106 and the secure object 104 with respect to which the task 106 is to be performed (block 302); dividing the secure object 104 into at least one or more secure sub-objects 204 each comprising data 208 and a context 206 associated therewith, the context 206 characterizing the data 208 as secure (block 304); and disassociating each data 208 of the one or more sub-objects 204 from the associated context 206, the secure characterization of the data 208 being substantially non-discernable from the disassociated data 208 (block 306). In one embodiment, the context 206 comprises an attribute of the associated data 208 and the disassociating further comprises separating the attribute from the data 208. For example, the attribute may include a characteristic of the data 208, a label associated with the data 208, a tag associated with the data 208, a type associated with the data 208, a source of the data 208, a destination of the data 208, the data 208 of another secure sub object 204 or a combination thereof. Alternatively, or in addition thereto, the attribute may include a number of alphanumeric digits in the data 208 wherein the disassociating further comprises dividing the data 208 into at least two disassociated data, each of the at least two disassociated data 208 comprising a sub-set of the number of alphanumeric digits such that the number of alphanumeric digits in the data 208 cannot be discerned from each sub-set alone.

The operation of the system 100 further includes: dividing the task 106 into one or more sub-tasks 202 to be performed with respect to the disassociated data 208 of each of the one or more secure sub-objects 204 (block 308); and distributing to the non-secure environment at least one of the disassociated data 208 and a specification of the respective sub-task 202 to be performed with respect thereto, such that the ability to discern the secure characterization of the data 208 in the non-secure environment is substantially reduced (block 310). The distributing may include arranging for the performance of the sub-task with respect to at least one of the disassociated data with an available participant of a workforce, the available participant being unaware of the secure characterization of the data distributing the at least one of the disassociated data and a specification of the respective sub-task to be performed with respect thereto to the available participant.

In one embodiment, the operation of the system 100 further includes: receiving the results 212 of the performance of each sub-task 202 (block 312); and compiling the results, the compilation 214 being substantially similar to a result of the completion of the task on the secure object 104 (block 314).

While the basic functionality of the system 100 to accept secure projects 102 and disseminate jobs 210 to a workforce to complete the project 102 without jeopardizing the security thereof has been described, further aspects of the disclosed embodiments include project 102, job 210 and workforce management functionality.

In particular, project management functionality may be provided which allows a requestor to manage the completion of one or more projects 102 by the system 100. Such functionality includes capabilities to specify a project 102 submission, such as to specify the task 106 to be performed and the secure object 104 with respect to which the task 106 is to be performed, the completion deadline, escalation, priority handling, the skills required or desired of participants, etc. Escalation relates to the actions to be taken if a suitable participant cannot be located to handle the jobs 210 within a designated time period. For example, the requestor may allow the jobs 210 to be distributed to a general population of participants if the results can be returned within a defined time limit. However, if the time limit is exceeded, the jobs 210 should be distributed to a selectively chosen population, such as the requestor's own employees, who are likely to complete the jobs 210 in the desired time frame. Priority handling relates to the order in which the jobs 210 are distributed and may control the queue order of the jobs 210 for distribution and/or the incentive, such as the compensation level, offered for completion of the jobs 210. Thereby, higher priority jobs 210 may be handled more quickly. Additionally, the interface may permit the requestor to designate how the task 106 and/or secure object 104 will be divided into sub-tasks 202 and sub-objects 204, e.g. by providing a template, etc., such as to ensure the protection of the underlying secure information. For example, a user interface may be provided, such as a world wide web page based interface, which permits a requestor to specify and submit a particular project 102, such as by uploading the secure object 104. The interface may further permit specification of the types of workers, e.g. the skill sets necessary, to complete the task 106, the expected results and/or the compensation that may be offered for such completion. In one embodiment, the interface is an application program interface which permits a requestor's workflow management systems to directly interface with the system 100, submit projects 102 for completion and receive the results 214 thereof. The interface may further permit monitoring and tracking of the progress of completion of the project 102, such as by reporting the job results 212 received for a given project 102. Where the system 100 is provided on a fee-for-services basis, the interface may provide an account management function permitting a requestor to view the status of their account, such as how much they presently owe the operator of the system 100 for services rendered. The interface may also permit the reporting of errors or problems and/or the selection of optional services such as quality control services. For example, a requestor may request double-blind keying of data where multiple duplicate jobs 210 are distributed and the results thereof compared to ensure the quality of the task results 214. Alternatively, one or more jobs 210 may include the task 202 of validating the results 212 of another job 210.

Job 210 management functionality may further be provided to manage the distribution of jobs 210 to a workforce, or otherwise arrange for one or more workforce participants to complete the jobs 210, and the receipt of the job results 212 therefrom. Such functionality may include tracking, auditing and or quality control functions to ensure that all of the jobs 210 are completed in a satisfactory and timely manner. In one embodiment, where a worker is taking too long to complete a task 202 of a job 210, the distributor 116 may pull the job 210 back or otherwise cancel the job 210 and redistribute the job 210 to another worker for completion. In another embodiment, selective job 210 distribution is implemented whereby the distributor 116 tracks the capabilities and/or qualifications, such as the skill sets, of the various workforce participants and distributes jobs 210 to those participants based on a correlation between specified requirements of the jobs 210 and the capabilities/qualifications of the participants. For example, the distributor 116 may be aware of which participants are fluent in the French language and thereby, distribute tasks 202 involving translation of the French language only to those participants that are qualified. As will be described below, functionality may be provided to allow participants to specify their capabilities or qualifications, or otherwise measure or improve these capabilities or qualifications, such as by tests, e.g. test jobs 210 where the job results 210 are known to the system 100 in advance and may be compared with the actual job results 210, or training. In yet another embodiment, the distributor 116 offers compensation for satisfactory completion of jobs 210 so as to incentivise workforce participants to take on jobs 210. For example, the distributor 116 may implement a "Dutch" auction or other compensation mechanism to incentivise participation. Other mechanisms of job 210 distribution which may be implemented include subscription based systems whereby workforce participants subscribe to be notified when jobs 210 are available, or alternatively, to have available jobs 210 pushed to them automatically.

In systems 100 offering compensation for job 210 completion, the system 100 may merely act as a broker between the requesters and the workforce participants. Alternatively, the system 100 may offer compensation itself, recouping such expenses via the fees charged to requesters. In particular, workforce participants may be compensated via any available compensation mechanism, such as cash, check, direct deposit or PayPal. The system 100 may be aware of employment, tax and other regulatory requirements of the jurisdictions in which the system 100 operates and in which the workforce participants perform the jobs 210. Such requirements may be considered in the manner in which participants are compensated as well as the nature of that compensation. For example, the system 100 may withhold suitable income taxes on behalf of a jurisdiction. In another example, certain non-monetary benefits, such as health or worker compensation insurance, may be provided in lien of monetary compensation in jurisdictions which mandate such benefits.

Workforce management functionality may also be provided to manage the workforce participants available for the performance of jobs 210. Such functionality may include interfaces, such as world wide web based interfaces, allowing individuals to elect, enroll or otherwise sign up to participate, withdraw from participation, receive training on how to participate or perform tasks 202, review ratings or reviews of their performance, review ratings/raking of their performance relative to other workforce participants, obtain jobs 210, or notification thereof, to perform, submit job results 212, receive and/or monitor earned compensation, or combinations thereof. In one embodiment, enrollment may require the participant to pass a test, such as a test job 210, in order to demonstrate their qualifications or capabilities to participate. Such testing may occur on a one-time or recurring basis.

Figure 4:
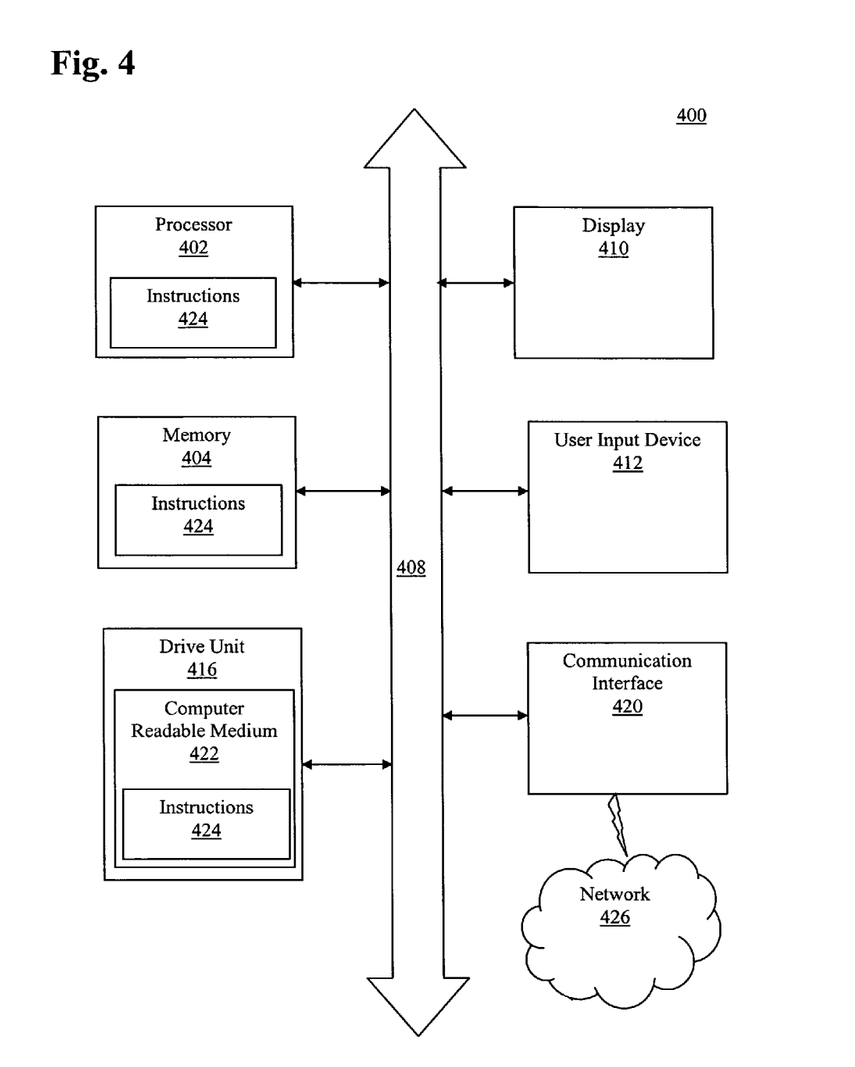
FIG. 4 depicts an exemplary computer system for use with the system of FIG. 1.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, including, but not limited to the project receiver 108, the object separator 110, the object disassociator 112, the task divider 114, the distributor 116, the results receiver 118 and/or the compiler 120 may be a computer system 400 or a component in the computer system 400.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication port 918. The communication port 418 may be a part of the processor 402 or may be a separate component. The communication port 418 may be created in software or may be a physical connection in hardware. The communication port 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 900 may be physical connections or may be established wirelessly.

The network 420 may include wired networks, wireless networks, or combinations thereof, and may be representative of the network 122, 124, 126, 128 in FIG. 1. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

It is therefore intended that the foregoing detailed description be regarded as illustrative rather than limiting, and that it be understood that it is the following claims, including all equivalents, that are intended to define the spirit and scope of this invention.

We claim:

1. A method of completing a task in a non-secure environment with respect to a secure object, the method comprising:
   receiving, by a processor, in a secure environment, the secure object with respect to which the task is to be performed;
   dividing, by the processor, the secure object into at least two or more secure sub-objects each comprising data and one or more contexts associated therewith, the one or more contexts each characterizing the data as secure;
   further dividing, by the processor, the secure sub-objects such that each data of the two or more secure sub-objects is disassociated from each of the associated one or more contexts such that none of the secure characterization of the data is distributed with the disassociated data, the task comprising one or more sub-tasks to be performed with respect to the disassociated data of each of the two or more secure sub-objects;
   arranging, by the processor, for the performance of the one or more sub-tasks with one or more available participants of a workforce, the one or more available participants being in the non-secure environment and unaware of the secure characterization of the data; and
   distributing, by the processor, to the one or more available participants in the non-secure environment, at least one of the disassociated data such that the respective sub-task may be performed with respect thereto, and wherein the ability to discern the secure characterization of the data in the non-secure environment is reduced.

2. The method of claim 1 further comprising:
   receiving, by the processor in the secure environment, a specification of the task; and
   dividing, by the processor, the task into the one or more sub-tasks to be performed with respect to the disassociated data of each of the two or more secure sub-objects.

3. The method of claim 1 wherein the distributing further comprises distributing, by the processor, the respective sub-task along with the at least one of the disassociated data with respect to which the respective sub-task is to be performed.

4. The method of claim 1 further comprising:
   receiving, by the processor, the results of the performance of each sub-task; and
   compiling, by the processor, the results.

5. The method of claim 1 wherein the secure object comprises computer incomprehensible information, the task comprises converting the computer incomprehensible information into computer comprehensible information.

6. The method of claim 1 wherein the task comprises data entry, conversion, translation, verification, transcription, analysis, identification, description, indexing, categorization, classification, selection, separation, isolation, recognition, sorting, correction, relation, opining, assessment, judgment or combinations thereof.

7. The method of claim 1 wherein at least one of the one or more contexts comprises an attribute of the associated data.

8. The method of claim 7 wherein the disassociating further comprises separating, by the processor, the attribute from the data.

9. The method of claim 7 wherein the attribute comprises a characteristic of the data, a label associated with the data, a tag associated with the data, a type associated with the data, a source of the data, a destination of the data, the data of another secure sub-object or a combination thereof.

10. The method of claim 7 wherein the attribute comprises a number of alphanumeric digits in the data.

11. The method of claim 10 wherein the disassociating further comprises dividing, by the processor, the data into at least two disassociated data, each of the at least two disassociated data comprising a sub-set of the number of alphanumeric digits such that the number of alphanumeric digits in the data cannot be discerned from each sub-set alone.

12. The method of claim 1 wherein the secure object comprises a representation of a handwriting, a picture, an image, a facsimile, a document, an audio recording, a video recording, or combinations thereof.

13. A system for facilitating completion of a task in a non-secure environment with respect to a secure object, the system comprising:
   at least one processor device configured to operate as:
      a project receiver operative to receive, in a secure environment, the secure object with respect to which the task is to be performed;
      an object separator coupled with the project receiver and operative to divide the secure object into at least two or more secure sub-objects each comprising data and one or more contexts associated therewith, the one or more contexts each characterizing the data as secure;
      an object disassociator coupled with the object separator and operative to further separate the two or more secure sub-objects so as to disassociate each data of the two or more secure sub-objects from each of the associated one or more contexts such that none of the secure characterization of the data is distributed with the disassociated data, the task comprising one or more sub-tasks to be performed with respect to the disassociated data of each of the two or more secure sub-objects; and
      a distributor coupled with the object disassociator and the task divider and operative to distribute to one or more participants of a workforce in the non-secure environment at least one of the disassociated data such that the respective sub-task may be performed with respect thereto, and wherein the ability to discern the secure characterization of the data in the non-secure environment is reduced.

14. The system of claim 13 wherein the project receiver is further operative to receive, in the secure environment, a specification of the task, the system further comprising a task divider coupled with the project receiver and operative to divide the task into the one or more sub-tasks to be performed with respect to the disassociated data of each of the two or more secure sub-objects.

15. The system of claim 13 wherein the distributor is further operative to distribute the respective sub-task along with the at least one of the disassociated data with respect to which the respective sub-task is to be performed.

16. The system of claim 13 further comprising:
   a result receiver operative to receive the results of the performance of each sub-task; and
   a result compiler operative to compile the results.

17. The system of claim 13 wherein the secure object comprises computer incomprehensible information, the task comprises converting the computer incomprehensible information into computer comprehensible information.

18. The system of claim 13 wherein the task comprises data entry, conversion, translation, verification, transcription, analysis, identification, description, indexing, categorization, classification, selection, separation, isolation, recognition, sorting, correction, relation, opining, assessment, judgment or combinations thereof.

19. The system of claim 13 wherein the at least one of the one or more contexts comprises an attribute of the associated data.

20. The system of claim 19 wherein the object disassociator is further operative to separate the attribute from the data.

21. The system of claim 19 wherein the attribute comprises a characteristic of the data, a label associated with the data, a tag associated with the data, a type associated with the data, a source of the data, a destination of the data, the data of another secure sub-object or a combination thereof.

22. The system of claim 19 wherein the attribute comprises a number of alphanumeric digits in the data.

23. The system of claim 22 wherein the object disassociator is further operative to divide the data into at least two disassociated data, each of the at least two disassociated data comprising a sub-set of the number of alphanumeric digits such that the number of alphanumeric digits in the data cannot be discerned from each sub-set alone.

24. The system of claim 13 wherein the secure object comprises a representation of a handwriting, a picture, an image, a facsimile, a document, an audio recording, a video recording, or combinations thereof.

25. The system of claim 13 wherein the distributor is further operative to distribute the at least one of the disassociated data and a specification of the respective sub-task to be performed with respect thereto to the one or more participants.

26. A system for facilitating completion of a task in a non-secure environment with respect to a secure object, the system comprising a processor device and a computer readable storage media coupled with the processor device, the system further comprising:
    means stored in the computer readable media and executable by the processor device for receiving in a secure environment, the secure object with respect to which the task is to be performed;
    means stored in the computer readable media and executable by the processor device for dividing the secure object into at least two or more secure sub-objects each comprising data and one or more contexts associated therewith, the one or more contexts each characterizing the data as secure;
    means stored in the computer readable media and executable by the processor device for further dividing the two or more secure sub-objects such that each data of the two or more secure sub-objects is disassociated from each of the associated one or more contexts such that none of the secure characterization of the data is distributed with the disassociated data, the task comprising one or more sub-tasks to be performed with respect to the disassociated data of each of the two or more secure sub-objects; and
    means stored in the computer readable media and executable by the processor device for distributing to one or more participants of a workforce in the non-secure environment at least one of the disassociated data such that the respective sub-task may be performed with respect thereto, and wherein the ability to discern the secure characterization of the data in the non-secure environment is reduced.

27. A non-transitory computer readable medium including instructions that when executed by a processor are operable to cause a system to facilitate completion of a task in a non-secure environment with respect to a secure object, the instructions operative to:
    receive, in a secure environment, the secure object with respect to which the task is to be performed;
    divide the secure object into at least two or more secure sub-objects each comprising data and one or more contexts associated therewith, the one or more contexts each characterizing the data as secure;
    further divide the secure sub-objects so as to disassociate each data of the two or more secure sub-objects from each of the associated one or more contexts such that none of the secure characterization of the data is distributed with the disassociated data, the task comprising one or more sub-tasks to be performed with respect to the disassociated data of each of the two or more secure sub-objects; and
    distribute to one or more participants of a workforce in the non-secure environment at least one of the disassociated data such that the respective sub-task may be performed with respect thereto, and wherein the ability to discern the secure characterization of the data in the non-secure environment is reduced.

\* \* \* \* \*